United States Patent
Stinton et al.

(10) Patent No.: US 12,078,884 B2
(45) Date of Patent: Sep. 3, 2024

(54) SYSTEM AND METHOD FOR ACCURATELY MAINTAINING LCD LUMINANCE, CONTRAST, AND RESPONSE TIME AT LOW TEMPERATURES

(71) Applicant: Mercury Mission Systems, LLC, Andover, MA (US)

(72) Inventors: Kathleen M. Stinton, Andover, MA (US); Charles Lemons, Andover, MA (US)

(73) Assignee: Mercury Mission Systems, LLC, Andover, MA (US)

( * ) Notice: Subject to any disclaimer, the term of this patent is extended or adjusted under 35 U.S.C. 154(b) by 12 days.

(21) Appl. No.: 17/682,459

(22) Filed: Feb. 28, 2022

(65) Prior Publication Data
US 2023/0273472 A1 Aug. 31, 2023

(51) Int. Cl.
*G02F 7/00* (2006.01)
*G02F 1/1333* (2006.01)

(52) U.S. Cl.
CPC .......... *G02F 1/133382* (2013.01); *G02F 7/00* (2013.01)

(58) Field of Classification Search
CPC .............................. G02F 1/133382; G02F 7/00
See application file for complete search history.

(56) References Cited

U.S. PATENT DOCUMENTS

| | | | |
|---|---|---|---|
| 5,736,922 A | 4/1998 | Goode, III et al. | |
| 5,896,098 A | 4/1999 | Goode, III et al. | |
| 6,089,751 A * | 7/2000 | Conover | G02F 1/133382 374/170 |
| 6,496,177 B1 * | 12/2002 | Burton | G09G 3/3611 345/87 |
| 8,009,262 B2 | 8/2011 | Dunn | |
| 8,089,440 B2 | 1/2012 | Dunn | |
| 8,702,307 B2 * | 4/2014 | Bartholmae | G02F 1/133382 374/141 |
| 9,267,849 B2 * | 2/2016 | Koudo | G01K 7/42 |
| 2008/0291386 A1 | 11/2008 | Dunn | |
| 2009/0251397 A1 * | 10/2009 | Dunn | G02F 1/133382 345/87 |
| 2010/0044361 A1 * | 2/2010 | Lin | H05B 1/0227 219/209 |

FOREIGN PATENT DOCUMENTS

JP 3093972 B2 * 10/2000 ............... G09G 3/28

* cited by examiner

*Primary Examiner* — Towfiq Elahi
(74) *Attorney, Agent, or Firm* — Standley Law Group LLP; Jeffrey S. Standley; Bryan P. Finneran (57) ABSTRACT

A liquid crystal display (LCD) having a temperature regulation framework which utilizes a digital to analog converter. The thermal management system involves display heating controlled based on temperature values calculated for the center of the display.

19 Claims, 8 Drawing Sheets

SYSTEM AND METHOD FOR ACCURATELY MAINTAINING LCD LUMINANCE, CONTRAST, AND RESPONSE TIME AT LOW TEMPERATURES

CROSS-REFERENCE TO RELATED APPLICATIONS

This application is an original filing, and does not claim priority to any other foreign or domestic filing.

TECHNICAL FIELD

Embodiments of the present disclosure relate to a liquid crystal display (LCD) having a temperature regulation framework which utilizes a digital analog converter. More particularly, embodiments relate to a novel thermal management system wherein display heating is controlled according to temperature values calculated for the center of the display.

BACKGROUND AND SUMMARY OF THE INVENTION

The use of liquid crystals in flat panel displays has been practiced for some time. LCD panels are commonly used today in various products, including aircraft instrument panels, such as avionic cockpit displays, to communicate visual information to a user. Known LCDs commonly comprise liquid crystal material positioned between a front color plate and a rear Thin Film Transistor (TFT) plate, comprising a rigid plate (typically glass) and a thin film transistor array layer (collectively, the "image layer"). Optically transparent electrical conductors, particularly indium tin oxide (ITO), may be used to apply an electric field across the liquid crystal material to drive the liquid crystals in a manner to generate images. Light utilized by an LCD may be reflected light or transmitted light that passes through the liquid crystal material. Liquid crystals are characterized by their ability to change their optical properties in response to applied electromagnetic fields.

Liquid crystal displays are temperature sensitive, with low ambient air temperatures potentially having an adverse effect on display performance. The ability of liquid crystal material to react to changing electrical conditions is strongly influenced by the effect of low temperatures. Without proper thermal management, LCD luminance/transmission, contrast and response time decrease significantly at ambient air temperatures below 0° C. (32° F.). For example, by way of illustration and not limitation, aircraft may be exposed to dramatic decreases in ambient air temperature in short periods of time as aircraft altitude increases, and it is critical to maintain LCD cockpit displays at a desired operating temperature range to prevent image errors caused by temperature-related luminance, contrast, and response time issues.

Known LCDs have addressed the threat posed by low ambient air temperatures by integrating heaters into panel designs, such as by optically laminating or bonding a cover glass with an electrically conductive heater, such as an ITO coating heater, to the front and/or rear of the image layer. For example, by way of illustration and not limitation, direct contact of optically transparent electrically conductive material on the front color plate may facilitate conductive heat transfer to the liquid crystal layer. Known heater layers often comprise thin films or grids of conductive material. Electrical power required to heat the display may be applied through electrical connecters placed along edges of a heater layer, allowing for the injection of current into the heater layer.

Determining the temperature of the liquid crystal layer of an LCD is imperative for appropriate thermal management. Traditionally, electrical input and associated heat intensity of the heater layer have been managed by one or more temperature sensors positioned at or near the edge(s) of an LCD panel display. Each temperature sensor may be in electronic communication with at least one control unit, such as, for example by way of illustration and not limitation, a microprocessor, field programmable gate array (FPGA), or the like, which may control a switch to modulate heating of the heater layer and maintain the LCD at a satisfactory operating temperature. Each temperature sensor may further be positioned in proximity to the liquid crystal layer on an edge glass layer. The temperature sensor(s) may communicate a measured LCD edge temperature value to the control unit, which may in turn evaluate whether the measured LCD edge temperature value properly maintains a predetermined operating temperature range. Where the measured LCD edge temperature value does not maintain a predetermined operating temperature range, the control unit, which may further be in electronic communication with a heater layer and/or a power supply thereto, may decrease or increase the amount of current into the heating layer, causing the heater layer, which may be in thermal communication with the liquid crystal layer, to regulate the temperature of the liquid crystal material. The temperature sensors may continuously communicate measured LCD edge temperature values to the control unit while the LCD is in use to ensure the operating temperature continues to maintain a predetermined minimum value, such as, for example, 0° C.

A major issue with known LCD thermal management systems and methods is that LCD edge temperatures are far cooler than the temperature of the liquid crystal material at the center of the display because the edges of the display are further removed from more centralized, heat emitting materials and are more exposed to low temperature ambient air. Thus, the heater layer may operate based on temperature measurements provided to the control unit which do not accurately reflect the operational needs of the liquid crystal material. This may cause issues, for example, heating which progresses beyond a desired temperature range. A desired temperature may be achieved at the edge of the display, but the possibility remains that the temperature at the center of the display may exceed a predetermined maximum operating temperature value.

Prior systems and methods have attempted to provide accurate temperature measuring schemes which reflect the operational needs of the LCD. For example, in U.S. Pat. No. 6,496,177 B1, an LCD temperature compensation control system involved controlling contrast voltage supplied for thermal management based on reference to an extended operating range for achieving a desired contrast ratio. Also, in U.S. Pat. No. 9,267,849 B2, a thermal management system involved linking a temperature sensor to a control unit which calculates temperature of the display panel based on a current temperature output value and an output value of the temperature sensor measured prior to the current temperature output value. However, these prior systems and methods fall short of accounting for the temperature of the liquid crystal material at the center of the LCD panel display.

Given that measured display glass edge temperatures are cooler than temperatures at the center of the display when a heater is active, the use of edge temperature values for heating control, without accounting for edge-center temperature gradient, may cause suboptimal heating (particularly, excessive heating at the center of the display). Proper luminance/transmission, response time, and contrast may not be achieved with suboptimal heating. When heating progresses beyond a desired temperature range, the operation and lifetime of the display may be compromised. Known heating technologies are prone to causing overheating related damage resulting in unusable LCDs or LCDs having optical problems. For example, by way of illustration and not limitation, excessive heating at the center of the display glass may cause LCD clearing, permanent damage to the polarizer, or the like. Furthermore, where heating progresses beyond a desired temperature range, far more power may be used than necessary. Thus, regulating an LCD edge temperature does not properly regulate the temperature of the liquid crystal layer across the entire display. Proper regulation of luminance/transmission, contrast and response time would be better achieved by corrective firmware accounting for edge to center temperature variance.

In view of this, it would be helpful to develop a system and method for accurately maintaining LCD luminance, contrast, and response time for displays which may be required to operate at low temperatures. Accordingly, the present invention is directed to a system and method for LCD thermal management wherein the center of an LCD display is maintained at a desired temperature regardless of low ambient air temperatures, including but not limited to ambient air temperatures far below 0° C. Exemplary embodiments of the present invention provide a primary advantage of optimal luminance/transmission, contrast, and response time for an LCD required to operate at any number of temperatures.

An object of the present invention is to optimize LCD thermal management through communication of measured temperatures to a temperature regulation framework which utilizes a digital to analog converter (digital analog converter, or DAC). The DAC may provide for optimized heat control based on temperature calculations for the center of the display.

According to the present invention in one aspect, at least one thermistor or other suitable device for measuring display temperature may be in electronic communication with a control unit such as a processor, microprocessor, FPGA, or the like, comprising a temperature regulation framework. The temperature regulation framework may comprise firmware providing a DAC (or heater control), heat input (Qc) look up table (QC LUT, or LUT), and center temperature calculator. The temperature regulation framework may be in electronic communication with a heating element, such as, by way of example and not limitation, an integral heater layer.

The at least one thermistor or other suitable device for measuring display temperature may communicate one or more temperature measurements to the control unit. The control unit may communicate a digital analog converter value based on a DAC heater setting or input ($DAC_h$) to the QC LUT in order for the control unit to determine a steady state temperature delta ($\Delta T_{(r)}$) between a center glass temperature ($T_c$) and an edge glass temperature ($T_{(edge)}$) for a given $DAC_h$. The center temperature calculator may calculate a summation of $T_{(edge)}$ and $\Delta T_{(r)}$ to determine $T_c$. The $T_c$ value may be communicated to the heater control, where the heater control may direct the heating element to adjust heating to the LCD based on whether the $T_c$ falls above or below a maximum or minimum predetermined operating temperature (the range of temperatures between the maximum and minimum predetermined operating temperatures are referred to herein as the "temperature threshold"). A primary benefit of an exemplary temperature regulation framework comprising an LUT is it ensures the center of the LCD does not overheat. Another benefit of an exemplary temperature regulation framework comprising an LUT is it ensures no more power is used for heating the display than necessary.

BRIEF DESCRIPTION OF THE DRAWINGS

Novel features and advantages of the present invention, in addition to those expressly mentioned herein, will become apparent to those skilled in the art from a reading of the following detailed description in conjunction with the accompanying drawings. The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
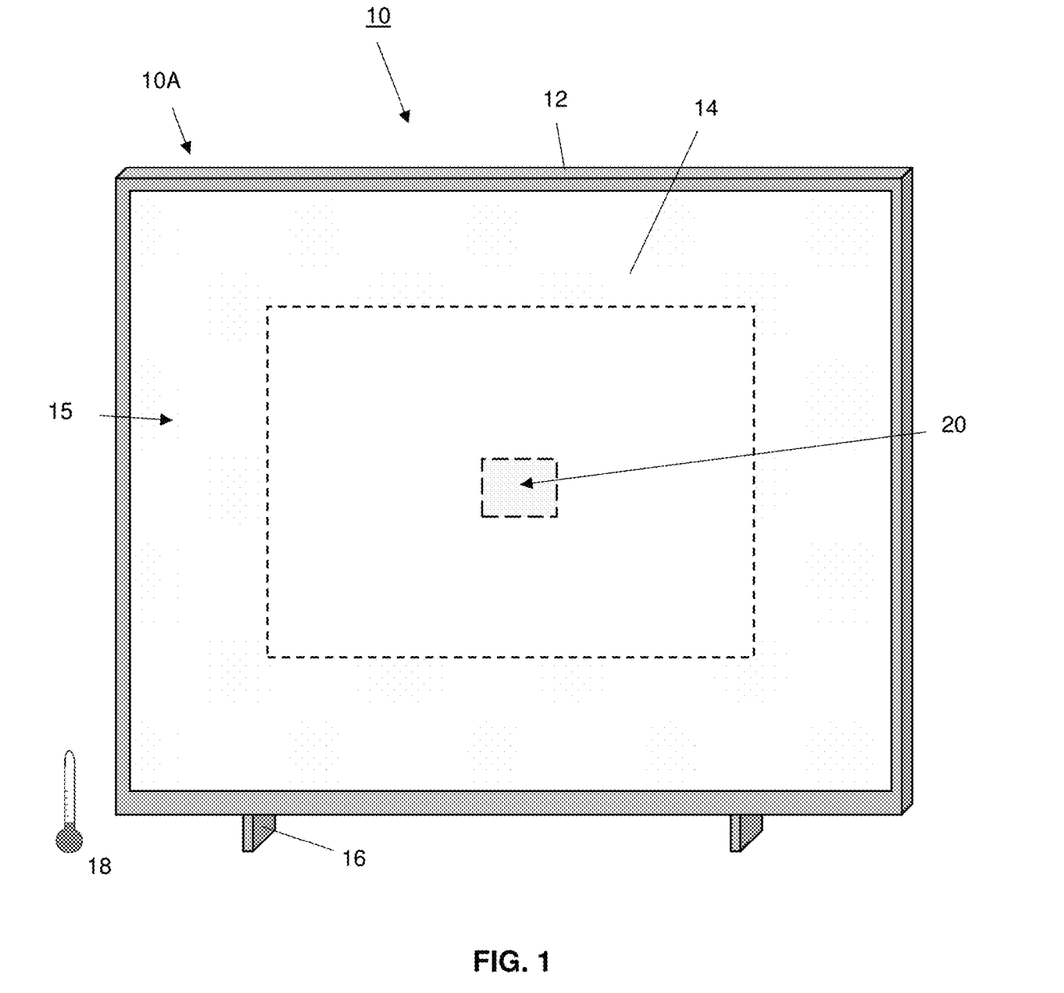
FIG. 1 is a front perspective view of an exemplary LCD being exposed to cold ambient air.

Referring now to FIG. 1, a front portion 10A of an exemplary LCD 10 is shown. The LCD 10 may comprise a housing 12 and a panel portion 14. The panel portion 14 may comprise an edge region 15 and a center 20. The housing 12 of LCD 10 may further comprise supports 16. A thermometer 18 is shown to demonstrate that the LCD 10 may operate at any number of temperatures, including temperatures below 0° C., or even significantly below 0° C. It will be understood by one of ordinary skill in the art that any number of shapes and/or sizes of LCDs and any number of different LCD housing configurations may be employed without departing from the scope of the present invention.

Figure 2:
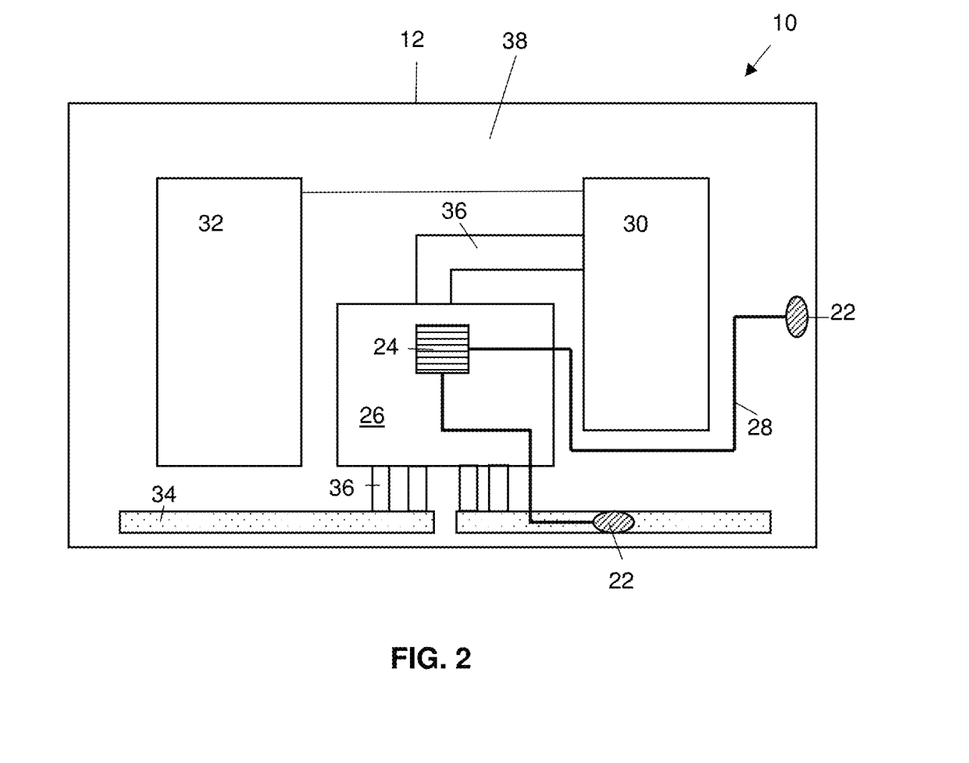
FIG. 2 is a plan view of the exemplary LCD of the FIG. 1 embodiment.

FIG. 2 shows an interior region 38 of the exemplary LCD 10 of the FIG. 1 embodiment, where various components of the LCD 10 are shown positioned within the housing 12. A power source circuit board 32 may distribute electric power from a power source (not shown) to the various other components positioned within the housing 12. An application circuit board 30 may function as an interface for an external device, and may further be linked to a central circuit board 26 by one or more flexible printed circuits 36. The central circuit board 26 may be configured to have at least one control unit 24 mounted thereto, wherein the control unit 24 may comprise a processor, microprocessor, FPGA, or the like. The at least one control unit 24 may be in electronic communication with one or more thermistors 22 or other suitable temperature sensors, such as, by way of illustration and not limitation, electronic wiring 28. Furthermore, source circuit boards 34 may be positioned within the housing 12. In certain embodiments, the source circuit boards 34 may control at least one TFT, and may be linked by one or more flexible printed circuits 36 to the central circuit board 26. The plurality of circuit boards 26, 30, 32, 34, and 36 may be mounted on a back surface of a rear frame (not shown) of the panel portion 14.

Figure 3:
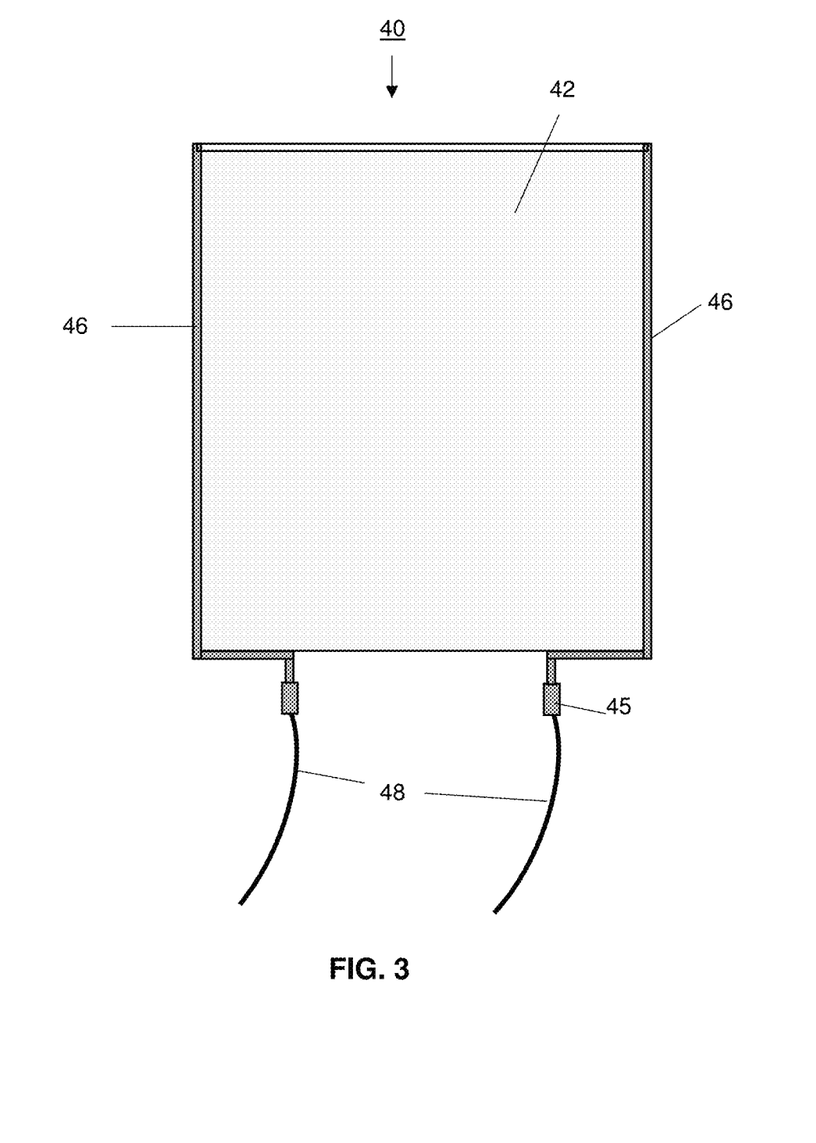
FIG. 3 is a front view of an exemplary integral heater layer.

Referring now to FIG. 3, an exemplary integral heater layer 40 is shown. The integral heater layer 40 may comprise current injector sections 46 where current may be injected into a film or grid of conductive material 42 to heat objects, surfaces or material, including by way of example and not limitation, liquid crystal material, in thermal communication with the conductive material 42. One or more wires 48 may direct power from a power source (not shown) to a power input 45 of the integral heater layer 40.

Figure 4:
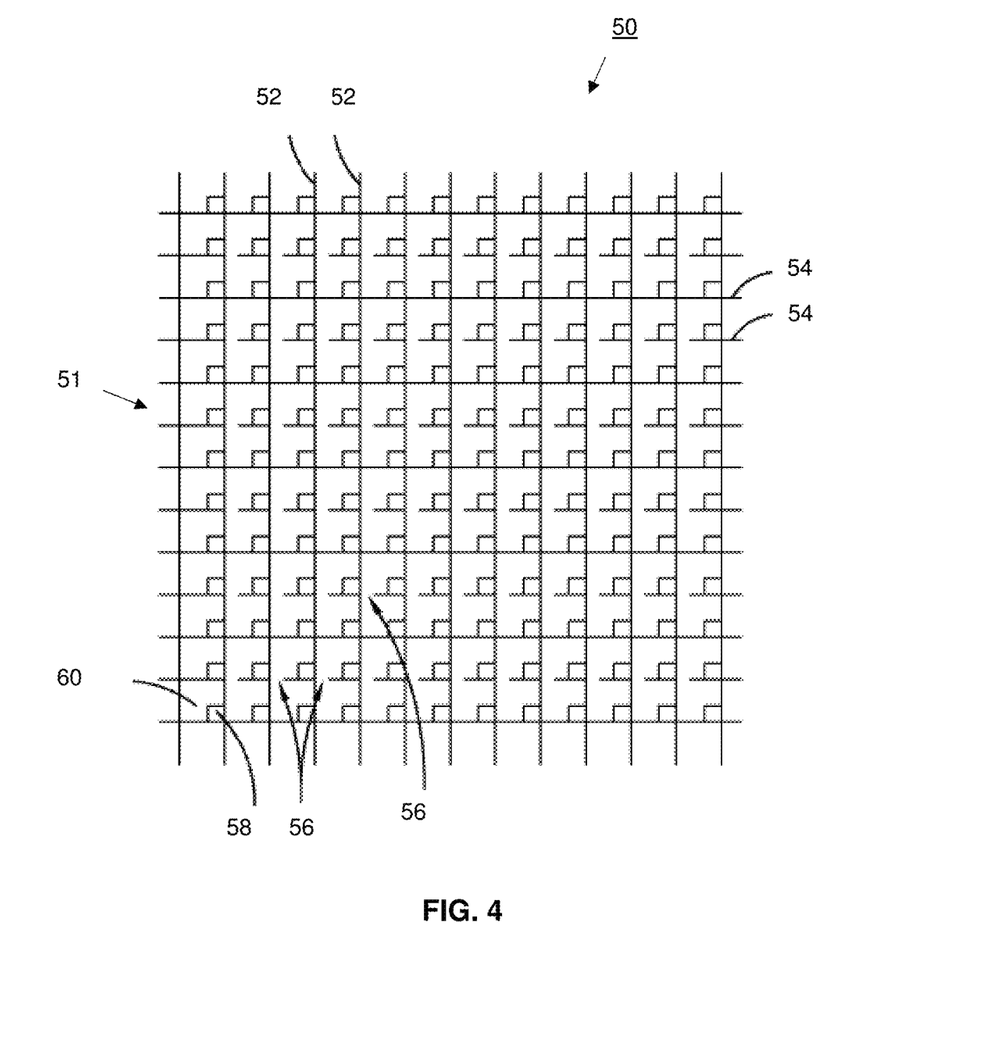
FIG. 4 is a plan view of another exemplary integral heater layer.

It will be understood by those of ordinary skill in the art that any number of different heating elements in electronic communication with at least one control unit may be employed without departing from the scope of the present invention. By way of example and not limitation, FIG. 4 illustrates another exemplary integral heater layer 50. This particular integral heater layer 50 comprises a grid of conductive material 51. The integral heater layer 50 may comprise a plurality of horizontal 52 and vertical 54 controlled-resistance heater conductors or lines that direct current through the layer 50. The integral heater layer 50 may also include selective discontinuities 56, transistors 58, and sub-pixel apertures 60.

Figure 5:
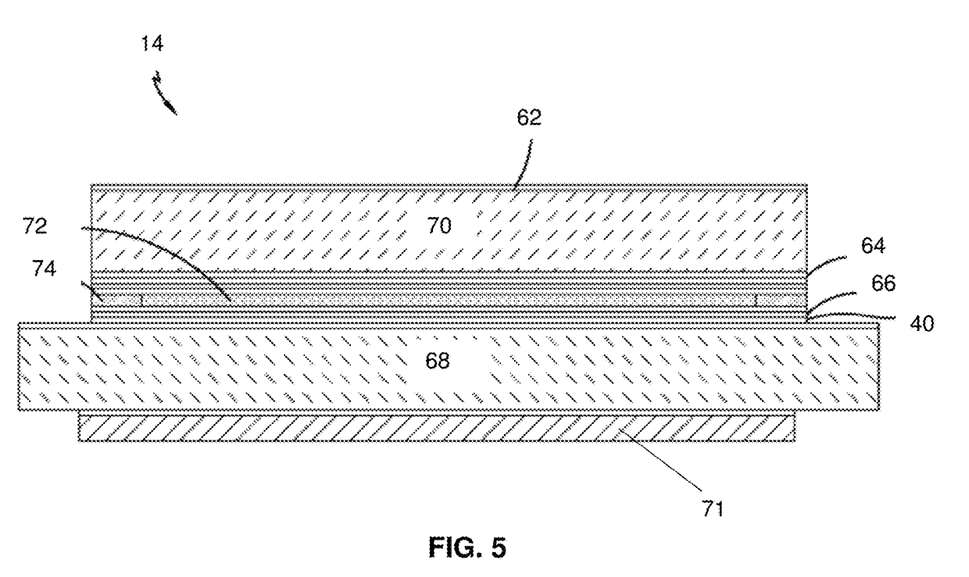
FIG. 5 is a cross-sectional, left-side view of an exemplary LCD panel display.
Figure 6:
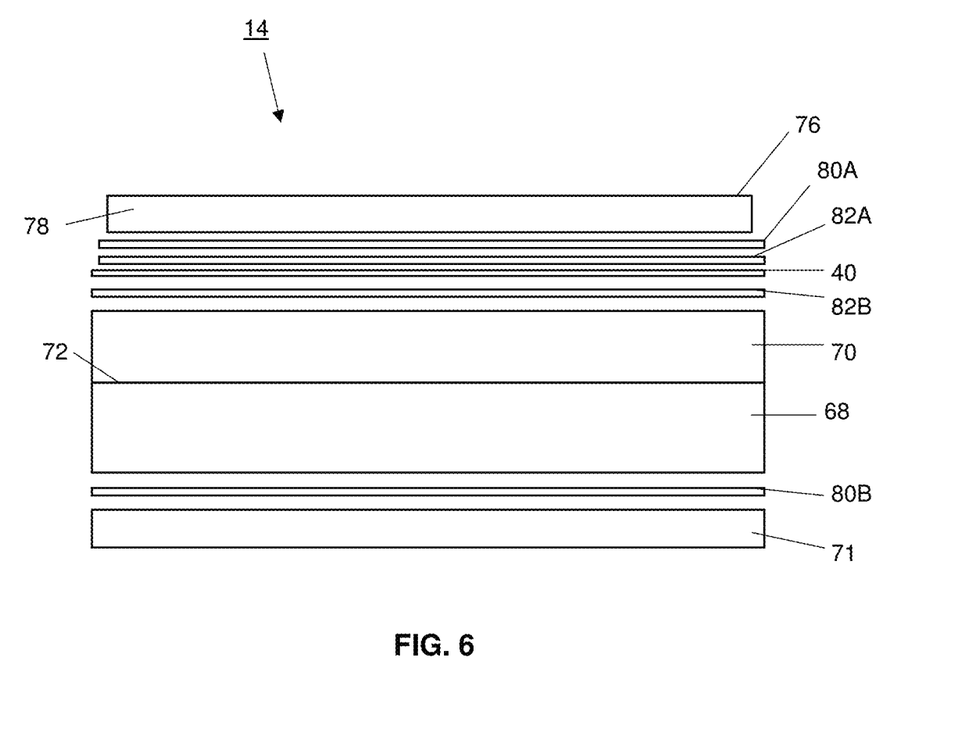
FIG. 6 is a left-side plan view of an exemplary LCD panel display.

FIG. 5 illustrates a side, cross-sectional view of the exemplary panel portion 14 of the FIG. 1 embodiment comprising an integral heater layer 40. The panel portion 14 may further comprise a number of other layers contributing to LCD visual display, including by way of example and not limitation, a front plate 62, black mask 64, TFT array 66, TFT plate 68, color filter plate 70, rear polarizer 71, liquid crystal material 72, and sealing adhesive 74, which may extend around the periphery of the plates maintaining the liquid crystal material 72 to prevent damage to or displacement of the material 72. FIG. 6 illustrates a plan view of the exemplary panel portion 14 wherein the panel portion 14 includes an integral heater layer 40, TFT plate 68, color filter plate 70, rear polarizer 71, liquid crystal material 72, anti-reflective coating 76, front polarizer 78, a first 80A and second 80B pressure sensitive adhesive layer, and a first 82A and second 82B index matching dielectric layer.

Figure 7:
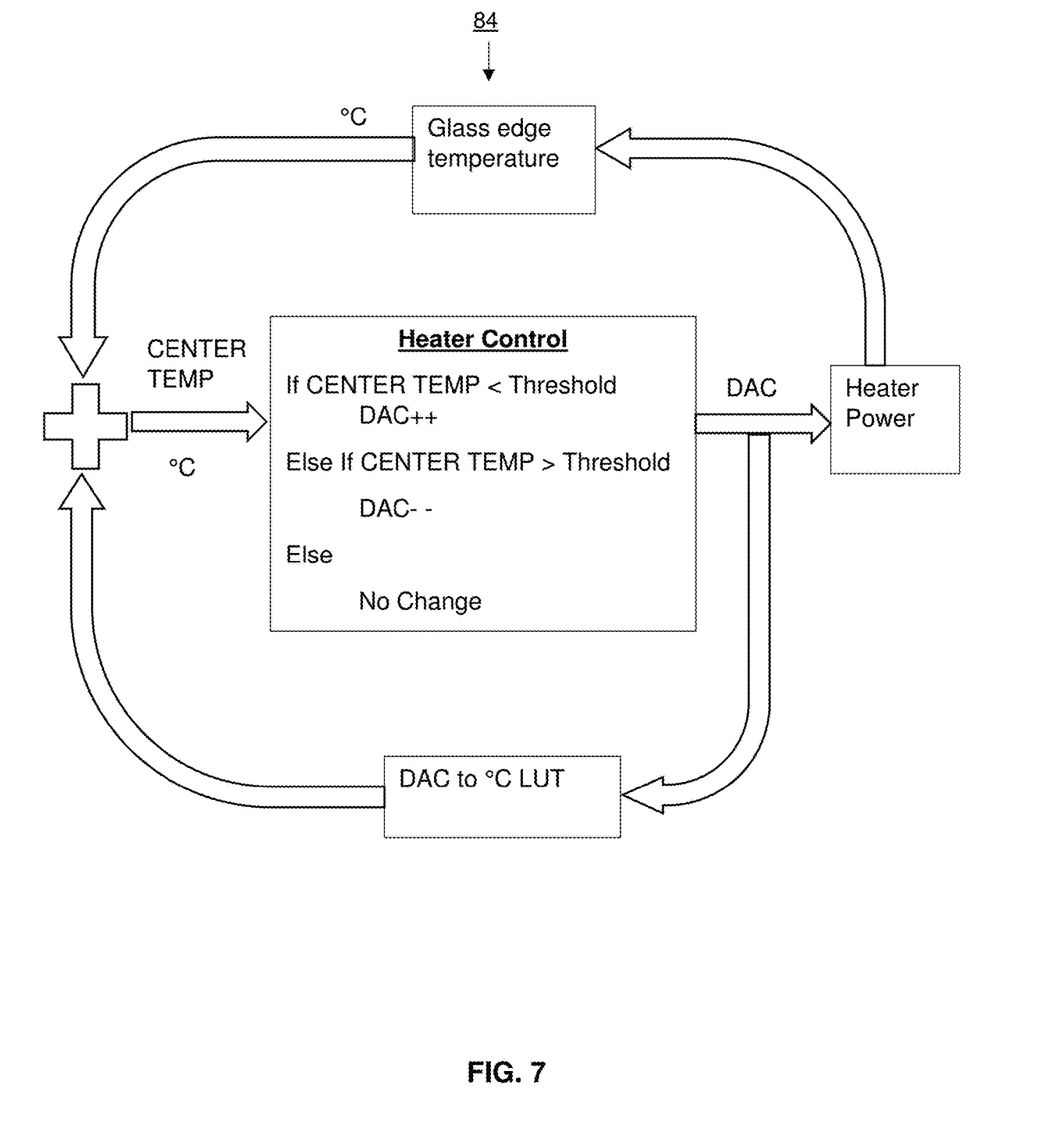
FIG. 7 illustrates exemplary logic according to a preferred embodiment of the present invention.

Referring now to FIG. 7, exemplary logic 84 of a preferred embodiment of the present invention is shown. In this particular embodiment, a suitable device for measuring display temperature measures the temperature of glass at or near the edge of an LCD panel portion. The temperature measuring device may be in electronic communication with a heater control unit of a temperature regulation framework. The temperature regulation framework may comprise firmware etched into a central control unit, the firmware linked to a digital analog converter (DAC) or heater control, heat input (Qc) look up table (QC LUT), and center temperature calculator. The temperature regulation framework may be in electronic communication with a heating element, such as, by way of example and not limitation, an integral heater layer. The temperature regulation framework may further be in electronic communication with one or more databases. By way of example and not limitation, one or more databases may provide the DAC information about the heating element to permit the DAC to communicate to the temperature regulation framework a digital analog converter value for that particular heating element ($DAC_h$). In other embodiments, the DAC may communicate directly with the heating element to regulate temperature of the display, wherein firmware etched into the control unit may control or set the $DAC_h$ value which is provided to the QC LUT, and/or a heating element value may be measured by the control unit and provided to the QC LUT, permitting a steady state temperature delta to be determined based on the $DAC_h$ value and/or heating element value.

The suitable device for measuring display temperature may electronically communicate one or more glass edge temperature measurements to the control unit. The DAC may communicate the $DAC_h$ to the QC LUT in order for the temperature regulation framework to determine a steady state temperature delta ($\Delta T_{(r)}$) between a center glass temperature ($T_c$) and an edge glass temperature ($T_{(edge)}$) for a given $DAC_h$. The center temperature calculator may calculate $T_{(edge)} + \Delta T_{(r)}$ to determine $T_c$. The $T_c$ value may be communicated to the heater control, where the heater control may direct the heating element to adjust heating to the LCD based on whether the $T_c$ falls outside the temperature threshold. In particular, the DAC setting may increment or decrement temperature by a value of 1: When the $T_c$ value is greater than the temperature threshold, the DAC may communicate a decrement of 1 (−−) to the heating element. When the $T_c$ value is less than the temperature threshold, the DAC may communicate an increment of 1 (++) to the heating element. When the $T_c$ value meets the temperature threshold, the DAC may communicate to the heating element that no change in output is to be made. The glass edge temperature may continuously be measured and fed back into the temperature regulation framework for continuous control over display temperature.

Figure 8:
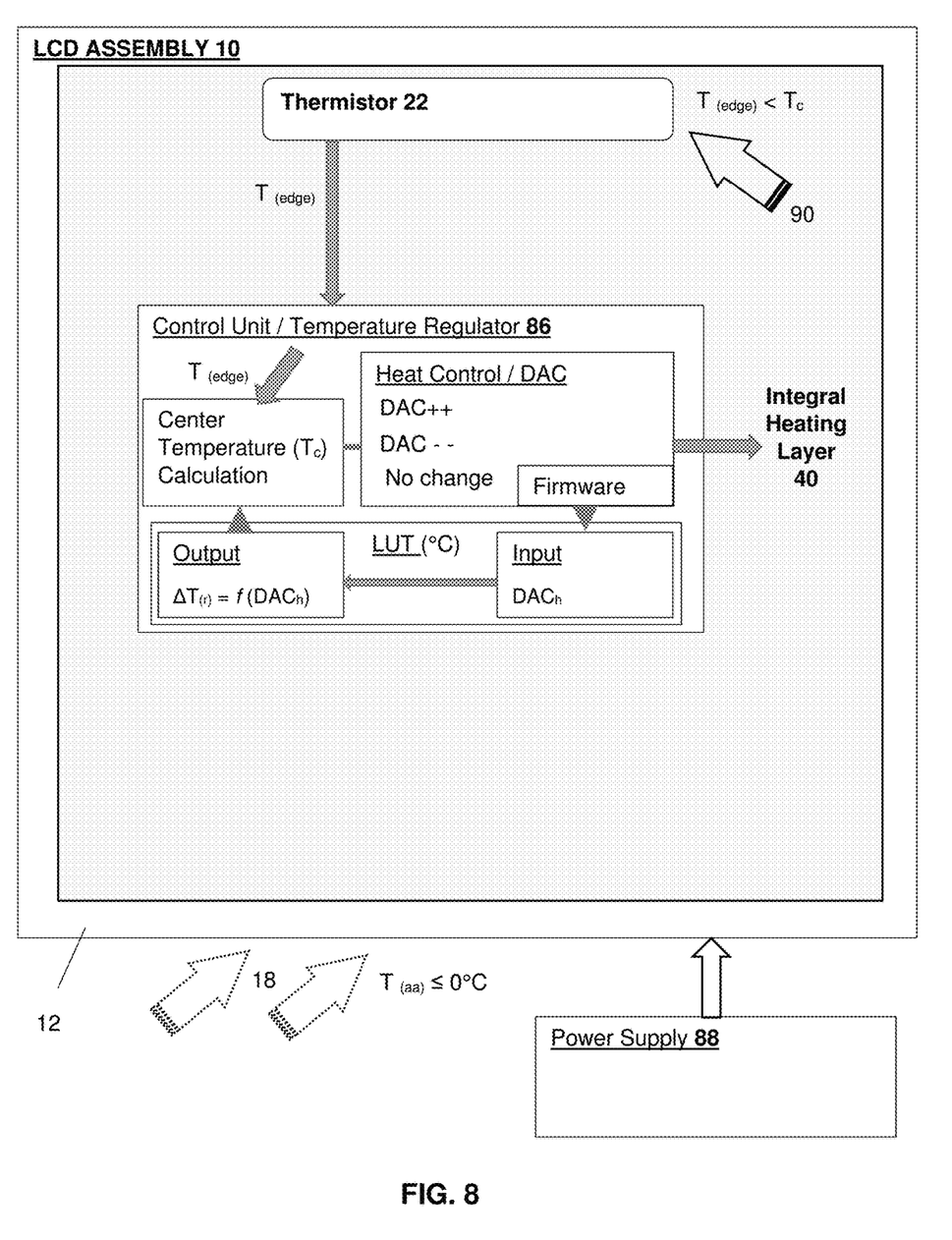
FIG. 8 also illustrates exemplary logic according to a preferred embodiment of the present invention.

FIG. 8 further illustrates exemplary logic according to a preferred embodiment of the present invention. In this particular embodiment, the LCD assembly 10 having a housing 12 comprises at least one thermistor 22, a control unit or temperature regulator 86, and an integral heating layer 40. The ambient air 18 temperature ($T_{(aa)}$) may be equal to or below 0° C. The at least one thermistor 22 may measure the temperature of one or more LCD panels 90 at or near the edge of the LCD 10. The thermistor 22 may electronically communicate to the temperature regulator 86 the $T_{(edge)}$. The temperature regulator 86 may comprise a processor, microprocessor, FPGA, or the like. The temperature regulator 86 may further comprise a DAC and firmware providing a $DAC_h$ to an external DAC device controlling heater hardware circuitry (not shown), wherein the heater hardware circuitry may control the heating element 40. The temperature regulator 86 may further comprise a QC LUT and center temperature calculator. The temperature regulator 86 may electronically communicate with the integral heater layer 40 to achieve a desired LCD temperature. A power supply 88 may provide power to each of the thermistor 22, control unit/temperature regulator 86, and integral heater layer 40.

The control unit or temperature regulator 86 may communicate $DAC_h$ to the QC LUT in order for the control unit to determine a steady state temperature delta ($\Delta T_{(r)}$), which is a function of $DAC_h$ ($\Delta T_{(r)} = f(DAC_h)$). The $\Delta T_{(r)}$ value may account for variance between a center glass temperature ($T_c$) and an edge glass temperature ($T_{(edge)}$) for a given $DAC_h$. The center temperature calculator may calculate the sum of $T_{(edge)}$ and $\Delta T_{(r)}$ to determine $T_c$. The $T_c$ value may be communicated to the heater control, where the heater control may direct the heating element to adjust heating to the LCD based on whether the $T_c$ falls outside of the temperature threshold.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A system for maintaining a liquid crystal display comprising:
    a liquid crystal display assembly comprising
        a processor;
        a heating element in electronic communication with the processor;
        a temperature measuring device in electronic communication with the processor, wherein the temperature measuring device is positioned proximate to edge glass located away from a center of the liquid crystal display; and
        a power supply;
    wherein the temperature measuring device is adapted to communicate to the processor a first temperature value, wherein the first temperature value is a measurement of edge glass temperature;
    wherein the processor is configured to calculate a second temperature value based on the first temperature value and a steady state temperature delta, wherein the second temperature value is an estimate of temperature of liquid crystal material positioned at the center of the liquid crystal display; and
    wherein the processor is configured to adjust the heating element to achieve a desired temperature threshold when the second temperature value does not meet the desired temperature threshold; and
    wherein the heating element comprises a thermally conductive film or grid in thermal communication with liquid crystal material of the liquid crystal display assembly.

2. The system of claim 1 wherein the steady state temperature delta represents a temperature gradient between edge glass and liquid crystal material positioned at the center of the liquid crystal display.

3. The system of claim 1, wherein:
    the processor is configured to cause the heating element to increase by one when the second temperature value is less than the desired temperature threshold;
    the processor is configured to cause the heating element to decrease by one when the second temperature value is greater than the desired temperature threshold; and
    the processor is configured to cause no change to the heating element when the second temperature value meets the desired temperature threshold.

4. The system of claim 1, wherein the temperature measuring device comprises a thermistor or thermocouple.

5. The system of claim 1, wherein the second temperature value is the sum of the steady state temperature delta and measured edge glass temperature.

6. The system of claim 1, wherein LCD luminance, contrast and response time are maintained below 0° C. to −200° C.

7. The system of claim 1, wherein the LCD assembly comprises an aircraft cockpit display, ground vehicle display, boat display, or submarine display.

8. A system for maintaining a liquid crystal display comprising:
    a liquid crystal display assembly comprising
        a control unit;
        a heater in electronic communication with the control unit;
        a temperature measuring device in electronic communication with the control unit; and
        a power supply;
    wherein the temperature measuring device is adapted to communicate to the control unit at least one measured edge glass temperature value;
    wherein the control unit includes a processor to calculate a center temperature value for the display based on the at least one measured edge glass temperature value and a steady state temperature delta;
    wherein the control unit is configured to regulate the heater to meet a desired center temperature threshold;
    wherein the control unit is adapted to cause the heater to increase by one when the calculated center temperature value is less than the desired center temperature threshold;

wherein the control unit is adapted to cause the heater to decrease by one when the calculated center temperature value is greater than the desired center temperature threshold; and wherein the control unit is adapted to cause no change to the heater when the calculated center temperature value meets the desired center temperature threshold.

9. The system of claim 8, wherein:

the steady state temperature delta is capable of representing a temperature gradient between edge glass and liquid crystal material positioned at the center of the liquid crystal display.

10. The system of claim 9, wherein calculated center temperature is the sum of the steady state temperature delta and the at least one measured edge glass temperature value.

11. The system of claim 10, wherein the heater comprises a thermally conductive grid including a plurality of each horizontal and vertical controlled-resistance heater conductors in thermal communication with liquid crystal material of the liquid crystal display assembly.

12. The system of claim 8, wherein LCD luminance, contrast and response time are maintained below 0° C. to −200° C.

13. A method for maintaining a liquid crystal display comprising:

providing a processor;

providing a heating element in electronic communication with the processor;

providing a temperature measuring device in electronic communication with the processor, wherein the temperature measuring device is positioned proximate to edge glass located away from a center of the liquid crystal display;

providing a power supply;

causing the temperature measuring device to communicate to the processor at least one measured edge glass temperature value;

causing the processor to calculate a center temperature value for the liquid crystal display based on the at least one measured edge glass temperature value and a steady state temperature delta; and causing the processor to regulate the heating layer to meet a desired center temperature threshold.

14. The method of claim 13, wherein the steady state temperature delta is used to represent a temperature gradient between edge glass and liquid crystal material positioned at the center of the liquid crystal display.

15. The method of claim 13, further comprising:

causing the processor to cause the heating element to increase by one when the calculated center temperature value is less than the desired center temperature threshold;

causing the processor to cause the heating element to decrease by one when the calculated center temperature value is greater than the desired center temperature threshold; and causing the processor to cause no change to the heating element when the calculated center temperature value meets the desired center temperature threshold.

16. The method of claim 13, wherein the temperature measuring device comprises a thermistor or thermocouple.

17. The method of claim 14, wherein calculated center temperature is the sum of the steady state temperature delta and the at least one measured edge glass temperature value.

18. The method of claim 13, wherein the heating element comprises a thermally conductive film or grid in thermal communication with liquid crystal material of the liquid crystal display assembly.

19. The method of claim 13, wherein LCD luminance, contrast and response time are maintained below 0° C. to −200° C.

* * * * *